United States Patent [19]

Zimmer

[11] 4,090,681
[45] May 23, 1978

[54] AIRPLANE WITH TWO SUPERPOSED WINGS

[75] Inventor: Herbert Zimmer, Friedrichshafen, Germany

[73] Assignee: Dornier GmbH, Germany

[21] Appl. No.: 723,471

[22] Filed: Sep. 15, 1976

[30] Foreign Application Priority Data

Dec. 11, 1975 Germany .................. 2555718

[51] Int. Cl.² .................. B64C 3/06
[52] U.S. Cl. .................. 244/45 R
[58] Field of Search .............. 244/13, 15, 35 R, 34 R, 244/34 A, 35 A, 45 R, 40

[56] References Cited

U.S. PATENT DOCUMENTS

| | | | |
|---|---|---|---|
| 1,453,830 | 5/1923 | Coakley | 244/45 R |
| 2,461,805 | 2/1949 | Barker | 244/45 R |
| 2,576,294 | 11/1951 | Geraci | 244/45 R |
| 2,777,655 | 1/1957 | Graham | 244/45 R |
| 3,834,654 | 9/1974 | Miranda | 244/45 R |
| 3,981,460 | 9/1976 | Ratony | 244/45 R |

FOREIGN PATENT DOCUMENTS

| | | | |
|---|---|---|---|
| 1,397,402 | 3/1965 | France | 244/45 R |
| 1,210,930 | 3/1960 | France | 244/45 R |
| 42,428 | 7/1933 | France | 244/45 R |
| 7,321 of | 1912 | United Kingdom | 244/45 R |
| 11,921 of | 1912 | United Kingdom | 244/45 R |

Primary Examiner—Galen L. Barefoot
Attorney, Agent, or Firm—James E. Bryan

[57] ABSTRACT

This invention relates to an improvement in an airplane having two superposedly-arranged upper and lower sweptback wings which together form a closed frame, with reference to a front view thereof, the improvement comprising a rhombic shape of the frame with the upper wing having a negative V-position and the lower wing having a positive V-position, both of the wings being rearwardly sweptback, and the upper wing being more markedly sweptback than the lower wing, and at least the leading edge of the upper wing being positioned forward of the lower wing.

4 Claims, 11 Drawing Figures

AIRPLANE WITH TWO SUPERPOSED WINGS

The present invention relates to airplanes with two superposedly-arranged sweptback wings which together constitute a closed frame in a front view thereof.

Such wing configurations are based on the fact that, in the case of a finite wing moved through the air, there is effective, in addition to the frictional resistance, an induced drag which is proportional to the square of the lift and inversely proportional to the geometric extension of the wing in the direction of its span (in the direction of the $y$-axis) and height (in the direction of the $z$-axis). These interrelations were first dealt with theoretically by Ludwig Prandtl and Max Munk.

In the mathematical model representation used as a basis in this connection, the wing system is composed of lifting or supporting vortices with constantly changing circulation. Formed adjacent thereto are follower wakes or trailing vortices whose intensity of circulation corresponds to the change of the wing circulation, and which extend to infinity substantially in the current direction (in the direction of the $x$-axis). It is assumed in this connection that the form or shape of the vortex wake or trailing vortex and its circulatory distribution will not change so that cross-sections through the vortex wake or trailing vortex at a right angle to the airflow direction always adopt the form or shape of the wing or wing system about which the air flows, in a front view in the direction of the $x$-axis. The position of the wings or wing parts with reference to the $x$-direction does not enter into this theory. The induced drag is accordingly dependent only upon the form or shape of the cross-section through the vortex wake or trailing vortex far behind the wing.

In the theoretical investigations of Prandtl et al and others, a number of cross-sectional wing shapes, and thus of wing system shapes of equal span and equal lift have been compared with each other. Indicated therein are the proportions or ratios of the induced drag of a non-planar wing system with respect to that of a planar elliptical wing. It was found that this resistance ratio K represents a code or coefficient specific for a specific cross-sectional form or shape. Thus, for example a wing arrangement in biplane construction with a distance ratio of 0.5, based upon the distance of the wings in the direction of the $z$-axis, compared with a monoplane having a distance ratio of 0, has an induced drag approximately 38% lower with the same span and the same aerodynamic lift. Under the same premises, a wing with end plates having the same height as the distance of the wings of the biplane arrangement has 47% less; an annular wing and a biplane arrangement with end plates (box wings) with a height ratio of 0.5 has only half the induced drag as compared with the monoplane or single wing construction.

The aforementioned wing system in biplane construction has been known since the beginnings of flight. The advantage of this construction resides, in addition to the low induced drag, in the low wing weight attainable therewith. Because of the necessary reinforcements of the wings, the undesirable resistance, however, is relatively high, and as a consequence thereof, the use of this wing construction is considerably restricted.

While the construction with only one wing and end plates mounted thereon has a very low induced drag, as has been mentioned hereinbefore, it does have a high specific wing weight. The results from the relatively uniform circulatory distribution over the wing span which produces a high root bending moment.

In the known wing configuration in box form or shape, the straight wings are provided in a staggered manner with respect to the incident airflow from the front, and specifically in such a manner that the lower wing, with reference to the oncoming airflow is positioned rearwardly with respect to the upper wing. The wings are therein connected with each other at their ends by end plates. The end plates have an inclined position in the direction of the $x$-axis corresponding to the staggered arrangement of the wings. While this type of wing arrangement has a relatively low induced drag, here again there arise high root bending moments at the pivotal points of the wings at the air-plane fuselage. This requires at the wing root a corresponding wing thickness with adverse effects relative to the weight and also at supersonic flow.

Another known wing construction or arrangement has two wings, wherein the forward one has a trailing sweep with negative V-position, and the second one has a forward sweep with positive V-position. The two wings terminate in a common wing tip.

Known moreover is a wing configuration which has a rearwardly sweptback upper wing without V-position, and a lower forwardly sweptback wing with positive V-position, wherein the wings extend at the outer edges thereof into spindle-shaped bodies.

Additionally known in the art is a wing configuration which is box-shaped in a front view and in which a lower rearwardly sweptback wing is interconnected with an upper forwardly sweptback wing by way of sweptback end plates.

It is the object of the present invention to provide an airplane of high maneuverability and adaptability with simultaneous provision for high flying speeds by means of a special wing construction having a high lift coefficient with small resistance, both in supersonic and subsonic ranges, as well as having low weight.

In such an airplane which is intended to have high maneuverability, a number of requirements must be met which bear close relationship with each other. Thus, the wing construction must produce as low a resistance as possible both at subsonic and at supersonic speeds. Furthermore, a high lift coefficient must be attainable, and lastly, the aforementioned requirements must be attainable under the condition of as low a weight as possible.

From the stipulated requirements result, however, a number of problems which, in the known wing configurations, cannot, or can be only partly, considered as having been solved. When, for example, an airplane is constructed with a wing having a large aspect ratio or span, only the requirements of low resistance at subsonic speed and a high lift coefficient are attainable. In order that one be able to fulfill the requirement of a structure having the lowest possible weight, relatively thick wing profiles are needed for as great as possible a height of the wing spars. Such a construction, in turn, contradicts, however, the requirement, also to be considered, of as low as possible a resistance at supersonic speeds. For supersonic flow, thin wing profiles are employed inasmuch, as is well known, the wave resistance or drag increases to the square with the profile thickness. The load factor arising in airplanes with a high maneuverability during flying maneuvers forces one to use relatively compact wings, i.e. wings having a small aspect ratio. With this construction, however, the requirement for the lowest possible resistance and greatest possible lift coefficient is not attainable, as already has been indicated hereinabove.

In order to arrive at better solutions, or at least compromises with respect to the requirements stipulated hereinabove, it has become known in the art to produce additional vortices, for example by means of strake wings, or to provide auxiliary wings. The additional vortices also may be stabilized by means of gas jets, as is generally known. Another known measure in this connection is the provision of leading and trailing edge flaps, or the pivoting of the entire wing. These measures, however, significantly increase the weight due to the lift necessary for the pivoting of the wings and/or flaps, and also increase the required costs. Yet, with the wing constructions or configurations known to date, the disadvantages indicated cannot be eliminated without compromise solutions.

The object sought to be obtained according to the present invention is attained by virtue of the fact that the frame arrangement of the wings has a rhombic form or shape with an upper wing having a negative V-position, and a lower wing having a positive V-position, that both wings are rearwardly sweptback, that the upper wing has a greater sweepback than the lower wing, and that the upper wing is positioned ahead of the lower wing at least with its front edge, with reference to the airflow from the front.

With such a wing construction and arrangement it is possible to realize an airplane having an extremely high maneuverability. The induced drag is low both in the subsonic and also in the supersonic ranges with respect to the known wing constructions, with a simultaneously relatively low weight. While, in the box wing, the aerodynamic forces at the wing connection are transmitted, as in the individual or single wing, also as transverse force and as root bending moment, the root bending moment is eliminated in the wing system provided by the present invention. What does arise are only transverse and longitudinal forces so that at the inner wing part (the wing part in proximity to the fuselage) and the wing connection structure of the fuselage, a considerable amount of weight is saved. With the determined structural weight of the airplane it is possible, according to the present invention, that the wing system be imparted a greater span and that thus the induced drag be reduced. As a result of the fact that, in the inventive wing construction, the root bending moment is eliminated, it is possible that the individual or single wings be hingedly connected at the fuselage. In this manner it is possible that in the area of the inner wing, i.e. the part of the wing positioned in proximity to the fuselage, a profile thickness of 1 to 2% of the profile depth is realized, whereby the wave resistance or drag is there greatly reduced. The mutual wing support allows for a relatively great span and area of the wings, and, on the basis of the mutual wing interference, a high maximal lift is achieved without movable flaps. This too signifies a further reduction of the weight of the aircraft. Furthermore, a high lift coefficient thereby may be achieved both in the subsonic and in the supersonic ranges.

It is further proposed, according to another embodiment of the present invention, that, with approximately half the value of half the span, both wings have a vertical height distance of approximately one third of the depth of one of the wings. This particular construction of the wing system results, with the corresponding adjustment (setting angle) of the two wings with respect to each other in a two-dimensional flow, in a biplane arrangement by means of which an improved glide ratio and a high maximal lift are achieved as compared to individual or single wings.

For the further embodiment of the present invention it is also proposed that the upper wing is more markedly sweptback than the lower wing and includes approximately a negative V-position within a range of 6° to 10°, and the lower wing includes a positive V-position within a range of approximately 6° to 10°.

Furthermore, a specific embodiment of the inventive wing system consists in that at least one of the two wings has within the area of the fuselage markedly sweptback front edges drawn or pulled forward in known manner. Strake wings produce the free forward edge vortices known from delta wings which contribute to a further increase of the lift.

According to yet another embodiment of the present invention, it is provided that the wings are interconnected within the area of the outer edges thereof. Moreover, it is proposed by the present invention that both wings adjoin a common wing tip, and that the wings structurally adjoin each with the outer edge thereof a common disc-shaped end profile part extending at a right angle to the wing span. Thus formed is a structurally rigid triangular connection. As compared to the single wing or monoplane and the box wing, the root bending moment is advantageously eliminated, as already has been mentioned hereinbefore. Only transverse and longitudinal forces arise so that the connecting wing structure may be dimensioned correspondingly lighter. With the predetermined structural weight, a further increase of the wing span thus may be realized. Also achieved with the inventive construction, in addition to the features set forth above, is a significant improvement of the maximal lift and of the glide ratio.

A further essential feature of the present invention moreover resides in that the wings display directly in the area of the outer edges a height distance with respect to each other which is smaller than one third of the wing depth.

The inventive wing system is not limited to the use in airplanes of the type mentioned herein. Rather, also the wings of transonic transport planes may be constructed in the manner set forth herein. Also the wings of hydrofoils may be constructed as proposed by the present invention.

Embodiments according to the present invention and a comparison of various wing configurations are illustrated in the accompanying drawings, wherein FIG. 1 is a side view of an airplane with the inventive wing system;

Figure 5:
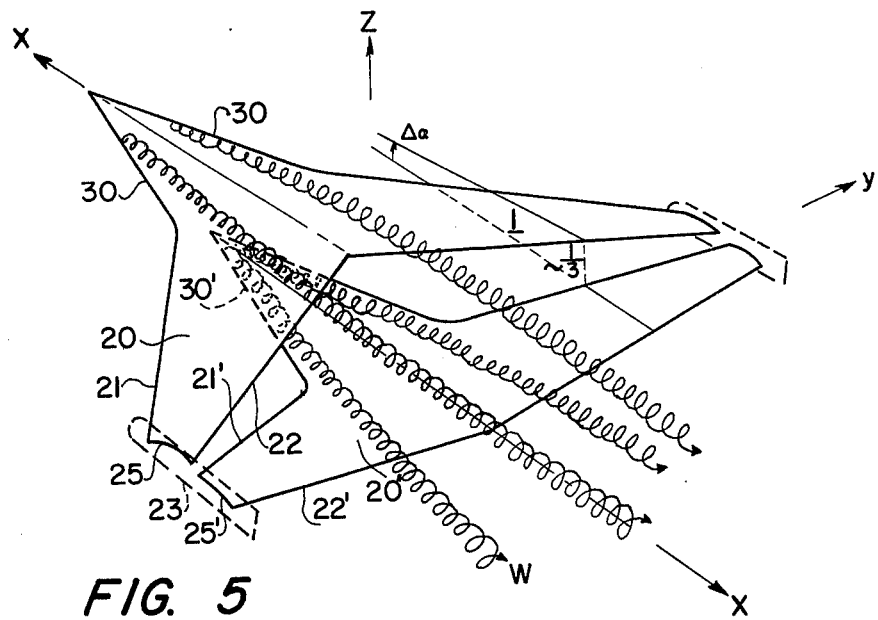
FIG. 5 is a schematic view of the flow conditions or ratios at the wing system, in perspective.
Figure 5A:
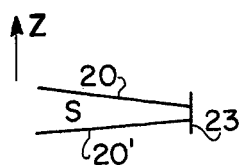
Figure 5B:
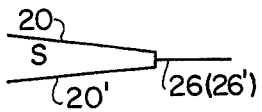
Figure 5C:
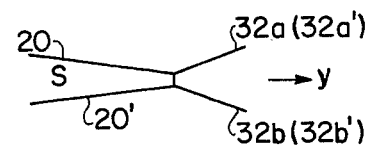
Figure 6A:
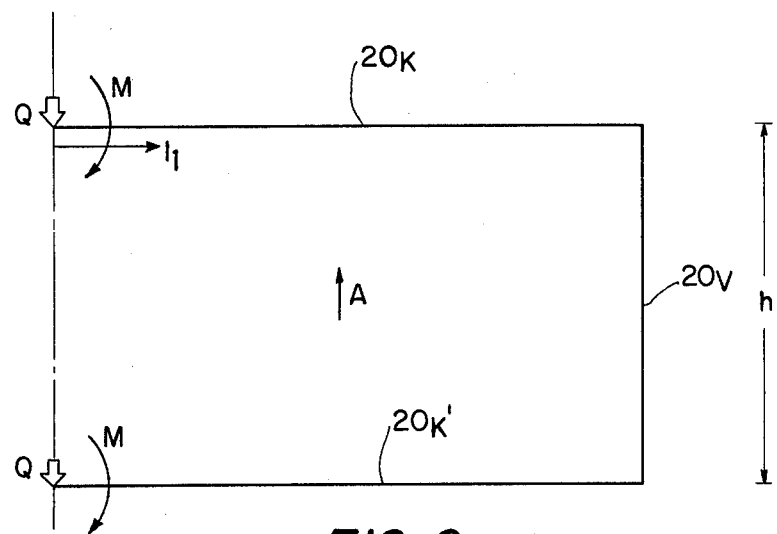
Figure 6B:
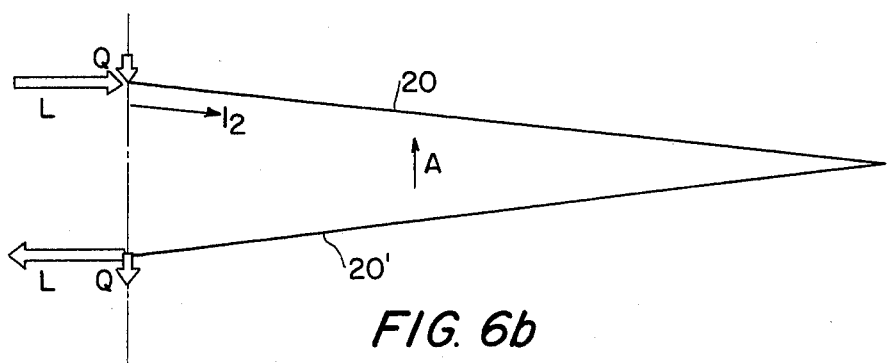
Figure 6C:
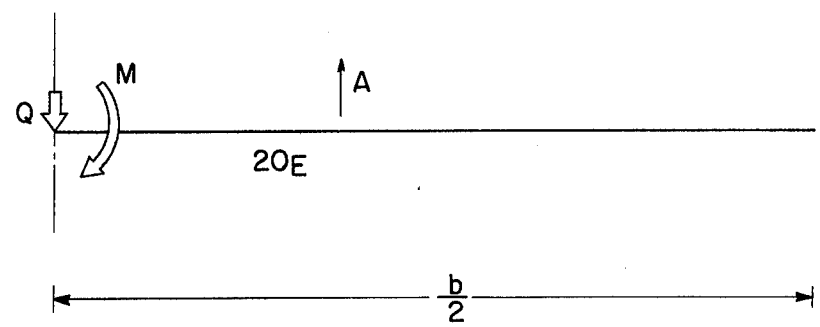

FIGS. 5a through 5c schematically illustrate, in a section from FIG. 5, embodiments of the wing tips, and FIGS. 6a through 6c illustrate the comparison of known wing constructions with the inventive wing system in a graph for purposes of comparing the wing distances in the direction of the vertical airplane axis and the span.

The airplane illustrated in FIGS. 1 through 5 of the drawings has a fuselage 2 with the nose 3, the fuselage central part 4, and the tail part 5. Arranged in the conventional manner at the tail part 5 is the tail unit or assembly which has here a pendulum horizontal stabilizer 11 and a rudder assembly fin 13 with a rudder surface 14. The specific arrangement of the horizontal stabilizer 11 at the airplane fuselage 2 will be further described hereinbelow.

Hingedly connected to the airplane fuselage 2 are an upper rearwardly sweptback wing 20 and a lower equally rearwardly sweptback second wing 20'. The upper wing 20 has a negative V-position while the lower wing 20' has a positive V-position. The upper wing 20 is secured to the fuselage 2 in the form of a high-wing monoplane arrangement and the other wing 20' in the form of a low-wing monoplane arrangement. Both wings 20 and 20' extend toward their outer edges 25 and 25' with a trapezoidally-decreasing wing depth T. In the front view, i.e. seen in the direction of the x-axis (the longitudinal air-plane axis), the wings 20 and 20' circumscribe a closed frame which has the form or shape of a rhombus or of a parallelogram.

On both sides of the airplane fuselage 2 the two wings 20 and 20' abut with their outer edges 25 and 25' against the end profile parts 23 and are structurally rigidly connected therewith. The end profile parts 23, in addition to being provided for structural purposes, also serve for preventing the lateral flow at the wings in the direction of the outer wing edges 25 and 25', and thus contribute to a lift increase. The union between the fuselage 2 and the wings 20 and 20' does not require a rigid connection. The forward or leading edges of the two wings 20 and 20' are defined with reference numeral 21, and 21', and the rear or trailing edges thereof are identified with reference numerals 22, and 22'. In the embodiment shown, viewed in a top plan view, the forward or leading edge 21' of the lower wing 20' is positioned under the rear or trailing edge 22 of the upper wing 20. In the area or range of half the span of the wing halves of the upper and lower wing 20 and 20', the distance or gap S (FIG. 2) between the two wings, with reference to the vertical airplane axis z amounts to approximately one third of the depth T of the wing at this point. This results - with the corresponding adjustment or setting of both wings 20 and 20' with respect to each other in a two-dimensional flow - in an optimal biplane arrangement.

Δ α identifies the setting angle of the two wings 20 and 20' with respect to each other. In conjunction with the vertical interval or separation h of the wings 20 and 20', this adjustment or setting has special importance, namely with respect to an improved glide ratio and a high maximal lift.

Both in the case of the upper and of the lower wing 20 and 20', the forward or leading edges 21 and 21' are markedly sweptback and drawn forwardly in the area of the fuselage 2 so that so-called strakes 30 and 30' are produced. These strakes produce the free forward or leading edge vortices W (FIG. 5) which are known from delta wings and which contribute to an additional increase of the lift at the wing. Further identified with reference numeral 6 is the position of the propulsion unit of the airplane. In the embodiment shown of the wing system, the air intake 7 of the propulsion unit 6 is advantageously positioned between the wings 20 and 20' and below the strake 30 of the upper wing 20. This position is favorable also at large angles of incidence or wing settings of the wing system against the flow.

Figure 1:
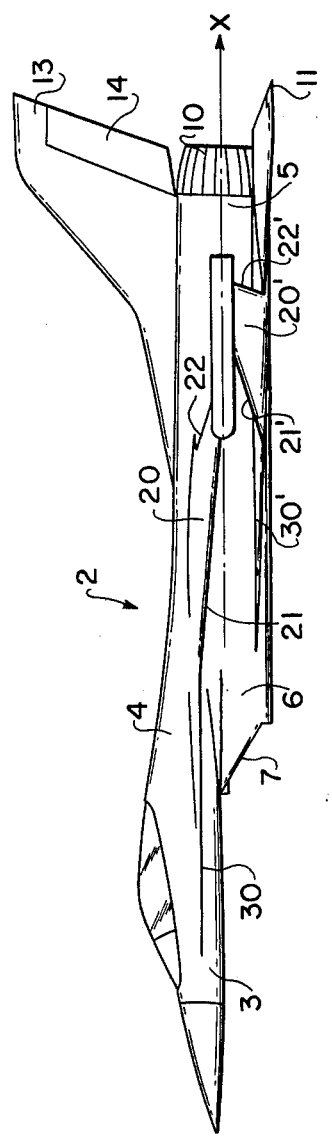
Figure 2:
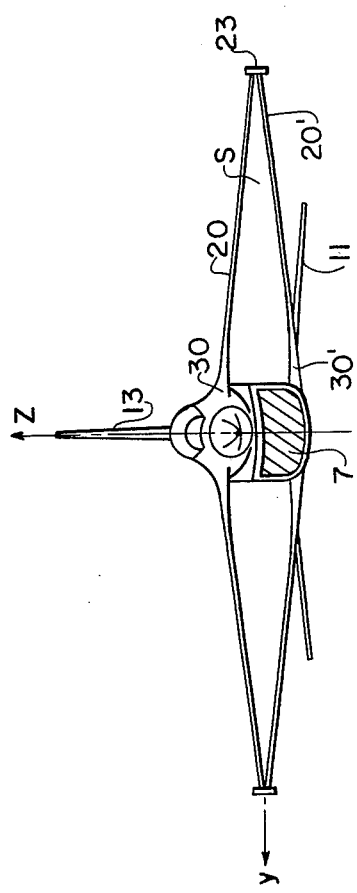
FIG. 2 is a front view of the wing system according to FIG. 1.
Figure 3:
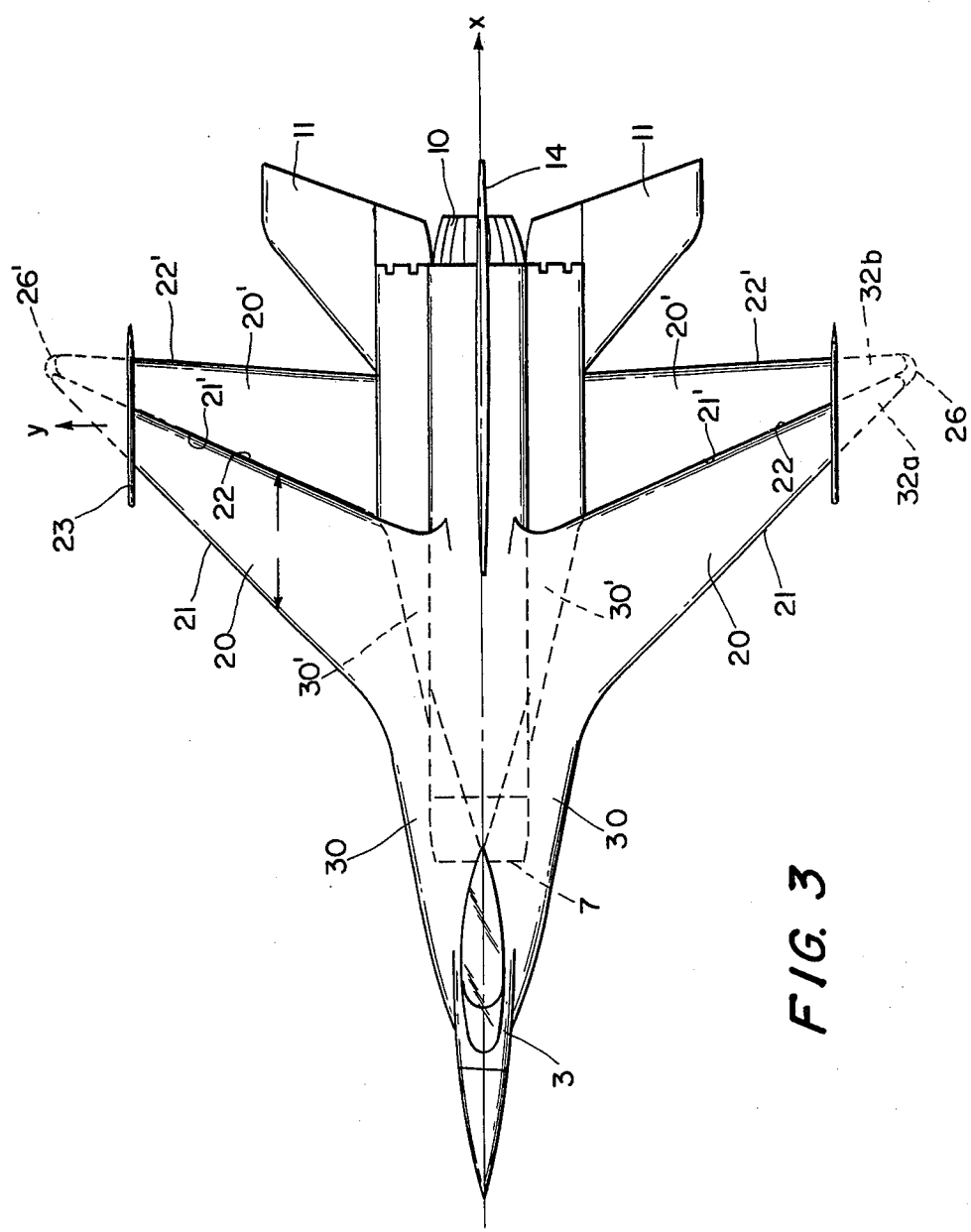
FIG. 3 is a top plan view of the wing system according to FIG. 1.
Figure 4:
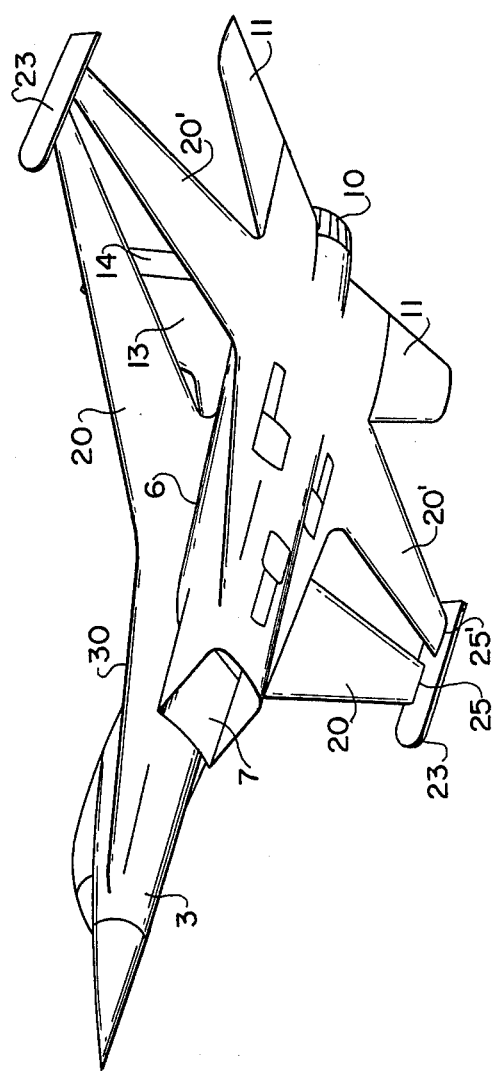
FIG. 4 is a perspective view of the inventive wing arrangement or construction.

As is further apparent from FIG. 3 and FIGS. 5a through 5c, a number of possibilities of construction are conceivable for the wings in the area or range of the outer wing edges 25 and 25'. FIG. 3 shows an embodiment in which the two wings 20 and 20' join an end profile part 23 and change over into a common wing tip 26 and 26'. In this case a gap S has been left at the connecting point of the two wings 20 and 20' (see also FIG. 5b).

By contrast, in the embodiment according to FIG. 5a, the provision was so made that the two wings 20 and 20' are rigidly connected with the end profile parts 23, and also in this case a gap S has been left at the connecting point of the wings 20 and 20' with the end profile parts 23. In both the embodiments according to FIGS. 3 and 5b, the wings 20 and 20' are connected over the wing tips 26 and 26' and/or the end profile parts 23 to form a rigid triangular union or formation. By means of the wing tips 26 and 26', an increased wing aspect ratio is moreover achieved aerodynamically.

In the embodiment according to FIG. 5c, the upper wing 20 has in the area of its outer edges 25 a connection with the lower wing 20' and wing tips 32a and 32a' with a positive V-position, and the lower wing 20' has a connection with wing tips 32b and 32b' with a negative V-position. Here again an air gap S has been left at the connecting point (25 and 25') between the upper and the lower wing 20 and 20'.

For the missing control flaps at the wings 20 and 20', the horizontal tail unit is so constructed that it assumes the rolling and altitude control, as is generally known.

As is apparent from FIG. 6, three wing systems are therein compared with the premise of equal aerodynamic performance.

In an airplane configuration actually made, the induced drag is of direct interest, and specifically for determined values of lift A and flying speed U∞. For the induced drag Wi, $$Wi = K \frac{A^2}{\frac{\rho}{2} U^2_\infty \pi b^2}$$

has validity, as has been stated already. Therein Wi is the induced drag, K the induced drag ratio, A the lift, U the relative wind velocity, and b the wing span, as well as $\rho$ the air density. It is obvious therefore that the induced drag ratio, in the aforestated equation, comes in directly, but the span to the square. If two different wing systems are to have the same lift at the same flying speed and at the same induced drag, the following equation may be derived therefrom:

$$\frac{b_2}{b_1} = \sqrt{\frac{K_2}{K_1}}$$

wherein $K_1$ and $K_2$ represent the induced drag ratio of two wing systems each being compared with each other. According to this equation, the systems shown in FIG. 6 are compared with each other. What is treated here in these wings are a box-type wing with the altitude ratio for example of 0.3 with the wings $20_K$ and $20_K'$, and the vertical wing part $20_V$, a rhombic wing according to the present invention, and an equivalent single wing, wherein the wing has been identified with reference symbol $20_E$.

The reference letter h identifies the distance between two wings in the direction of the z-axis of the wing system. While it is true that the span of the rhombic wing is by 27.5% larger than in the box-type wing with the same performance, the circumcirculated surface which strongly enters into the weight of the wing (here the developed length 1 of the cross section) is smaller by about 1%. While in the box-type wing $20_K$, $20_K'$ the aerodynamic forces at the wing connection are transmitted in the conventional manner as in the single wing as transverse force Q and as root bending moment M, the root bending moment is eliminated in the rhombic wing 20, 20'. Only transverse forces Q and longitudinal forces L arise so that at the inner wing (at the inner part of the wing) and at the wing connecting structure at the fuselage, weight is saved. With determined structural weight, the rhombic wing 20, 20' may be given a further increase of the span b than is apparent from FIG. 6 which, according to the equation for the induced drag, means a lower induced drag.

It will be obvious to those skilled in the art that many modifications may be made within the scope of the present invention without departing from the spirit thereof, and the invention includes all such modifications.

What is claimed is:

1. In an airplane having two superposedly-arranged upper and lower sweptback wings which together form a closed frame, with reference to a front view thereof, the improvement comprising that said upper wing is connected with the airplane fuselage in the form of a high-wing monoplane, and said lower wing is connected in the form of a low-wing monoplane, said frame having a rhombic shape with said upper wing having a negative V-position and said lower wing having a positive V-position, both of said wings being rearwardly sweptback, and said upper wing being more markedly sweptback than said lower wing, said wings being staggered in the direction of the wing depth and air flow such that the trailing edge of the upper wing is positioned approximately over the leading edge of the lower wing, plate-like means extending parallel to the vertical longitudinal central plane of the aircraft and connecting the outer parts of the upper and lower wings in a vertically staggered manner, and wing tip means, extending the wing span and common to both wings, associated with said upper and lower wings.

2. An airplane according to claim 1 in which said wing tip means are outboard of said plate-like means.

3. An airplane according to claim 1 in which said plate-like means form end plates at the wings and extend beyond at least one of said upper and lower wings.

4. An airplane according to claim 1 in which at least one of said wings has a more markedly sweptback leading edge portion than the remainder of said wing.

* * * * *